(12) United States Patent
Dong et al.

(10) Patent No.: US 10,871,755 B2
(45) Date of Patent: Dec. 22, 2020

(54) APPARATUS AND METHOD CAPABLE OF AUTOMATICALLY IDENTIFYING OBSTACLE IN FRONT OF MOBILE TERMINAL

(71) Applicant: GUANGDONG INDUSTRY POLYTECHNIC, Guangdong (CN)

(72) Inventors: Bing Dong, Guangdong (CN); Wensheng Qin, Guangdong (CN); Lan Huang, Guangdong (CN); Yanling Yang, Guangdong (CN); Deyu Luo, Guangdong (CN); Xin Ouyang, Guangdong (CN); Wenya Zhuang, Guangdong (CN); Jun Hong, Guangdong (CN)

(73) Assignee: Guangdong Industry Polytechnic, Guangdong (CN)

( * ) Notice: Subject to any disclaimer, the term of this patent is extended or adjusted under 35 U.S.C. 154(b) by 0 days.

(21) Appl. No.: 16/636,754

(22) PCT Filed: Mar. 1, 2018

(86) PCT No.: PCT/CN2018/077737
§ 371 (c)(1),
(2) Date: Feb. 5, 2020

(87) PCT Pub. No.: WO2019/029157
PCT Pub. Date: Feb. 14, 2019

(65) Prior Publication Data
US 2020/0218211 A1    Jul. 9, 2020

(30) Foreign Application Priority Data

Aug. 7, 2017    (CN) .......................... 2017 1 0665710

(51) Int. Cl.
*H04B 10/50*        (2013.01)
*G01B 11/14*        (2006.01)
(Continued)

(52) U.S. Cl.
CPC ........... *G05B 19/042* (2013.01); *G08B 21/24* (2013.01); *H04B 10/503* (2013.01); *H04M 1/72569* (2013.01)

(58) Field of Classification Search
CPC .............................. G01B 11/14; H04B 10/503
See application file for complete search history.

(56) References Cited

U.S. PATENT DOCUMENTS

| | | | | |
|---|---|---|---|---|
| 2015/0083921 A1* | 3/2015 | Ooyabu | ................. | G01S 17/931 250/341.8 |
| 2019/0154439 A1* | 5/2019 | Binder | ..................... | G01S 15/08 |
| 2020/0209401 A1* | 7/2020 | Motoyama | ........... | G08G 1/0141 |

FOREIGN PATENT DOCUMENTS

| | | |
|---|---|---|
| CN | 102523323 A | 6/2012 |
| CN | 203385858 U | 1/2014 |

(Continued)

OTHER PUBLICATIONS

Chinese-language International Search Report and Written Opinion issued in PCT Application No. PCT/CN2018/077737 dated May 22, 2018 with English translation (eleven (11) pages).

*Primary Examiner* — Shi K Li
(74) *Attorney, Agent, or Firm* — Todd Allen Serbin; Nexsen Pruet, LLC

(57) ABSTRACT

The present invention discloses an apparatus and method capable of automatically identifying an obstacle in front of a mobile terminal, the apparatus comprising a transmitting module, a receiving module, and a controller MCU module. The transmitting module is in signal connection to the receiving module, the transmitting module and the receiving module are both in signal connection to the controller MCU (Continued)

module (STM32 series), and the controller MCU module is also in signal connection to a mobile terminal CPU. The present invention may automatically identify the road condition in front of the mobile terminal and may carry out a voice prompt in time.

16 Claims, 5 Drawing Sheets

(51) Int. Cl.
    *G05B 19/042*    (2006.01)
    *G08B 21/24*     (2006.01)
    *H04M 1/725*    (2006.01)

(56) References Cited

FOREIGN PATENT DOCUMENTS

| | | |
|---|---|---|
| CN | 104280736 A | 1/2015 |
| CN | 105049600 A | 11/2015 |
| CN | 106899766 A | 6/2017 |
| CN | 107343107 A | 11/2017 |
| JP | 5120024 B2 | 1/2013 |

* cited by examiner

“APPARATUS AND METHOD CAPABLE OF AUTOMATICALLY IDENTIFYING OBSTACLE IN FRONT OF MOBILE TERMINAL

RELATED APPLICATIONS

This application is a U.S. national phase application, claiming priority under 35 U.S.C. 371 to PCT application PCT/CN2018/077737, filed Mar. 1, 2018, claiming priority to Chinese Patent Application No. 201710665710.X, filed on Aug. 7, 2017. The contents of these applications are incorporated herein by reference in their entireties.

TECHNICAL FIELD

The present invention relates to the technical field of mobile terminals, and in particular to an apparatus and method capable of automatically identifying an obstacle in front of a mobile terminal.

BACKGROUND

Mobile terminals (such as smart phones and palmtop computers) are increasingly more widely used in people's lives. Particularly, at present, a large number of mobile phone head-down users pay attention only to screens of the mobile phones, which leads to personal safety situations from time to time. For example, various dangers such as hit by a car while walking across a zebra crossing, falling into a ditch while walking on a roadside, stepping on empty at a platform, stepping on empty while going upstairs and downstairs on a flyover, tripped by various road obstacles (road construction materials, curb sides) may be caused due to a blind area generated in front of a mobile phone when a mobile phone head-down user uses his/her mobile phone. How to overcome the above-mentioned problems and how to make a prompt in advance by the mobile terminal before encountering the above dangers so as to avoid the occurrence of the dangers are technical difficulties that need to be solved in development of the mobile terminal technologies.

SUMMARY OF THE INVENTION

The main object of the present invention is to overcome the disadvantages and shortcomings in the prior art, and to provide an apparatus and method capable of automatically identifying an obstacle in front of a mobile terminal.

In order to achieve the above-mentioned object, the present invention uses the following technical solution:

The present invention discloses an apparatus capable of automatically identifying an obstacle in front of a mobile terminal, the apparatus comprising a transmitting module, a receiving module, and a controller MCU module. The transmitting module is in signal connection to the receiving module, the transmitting module and the receiving module are both in signal connection to the controller MCU module, and the controller MCU module is also in signal connection to a mobile terminal CPU; the transmitting module is configured to generate a laser transmitting signal and a difference frequency ranging signal containing phase information; the receiving module is configured to receive a laser transmitting signal when ranging and receive an infrared pyroelectric signal of a human body or a road surface when not ranging; and the controller MCU module is configured to identify a ranging signal and an infrared signal, and drive a corresponding voice data segment for playback and turn on a front-end main camera for working by means of the mobile terminal CPU so as to use voice to prompt a mobile terminal user to pay attention and to display a dangerous situation in front of the user by means of the front-end camera of the mobile terminal.

As a preferred technical solution, the transmitting module comprises a modulation driver, a laser transmitter, a laser reference device, and a frequency synthesizer; and the frequency synthesizer is in signal connection to the modulation driver and the laser reference device, and the modulation driver, the laser transmitter, and the laser reference device are sequentially connected.

As a preferred technical solution, the transmitting module is mounted near the main camera on the mobile terminal, a circular hole with the same diameter as the transmitting module is provided on the rear cover of the mobile terminal, and a laser signal of the transmitting module is transmitted through that circular hole.

As a preferred technical solution, the receiving module comprises a laser receiver, an infrared receiver, and filter amplifiers, and the laser receiver and the infrared receiver are both in signal connection to the corresponding filter amplifier.

As a preferred technical solution, the receiving module is mounted in a position close to the lower part of the transmitting module, another circular hole with the same diameter as the receiving module is provided on the rear cover of the mobile terminal, and the receiving module receives a laser signal reflected from a laser and an infrared pyroelectric signal of a road surface or a human body through that circular hole.

As a preferred technical solution, the controller MCU module is an STM32F103RBT6 micro-controller, which is mounted in the middle part of a main board of the mobile terminal and is in signal connection to the mobile terminal CPU module, the transmitting module, and the receiving module.

The present invention further discloses a method of an apparatus automatically identifying an obstacle in front of a mobile terminal, comprising the steps of:

S1, calculating, by the mobile terminal CPU, a mobile terminal inclination angle $\alpha$ in real time by means of a built-in acceleration sensor and gyroscope sensor when the mobile terminal is in use, wherein the mobile terminal CPU sends an instruction to the controller MCU module to wake it up for working when the angle of a is in a range of angles at which the user normally uses the mobile terminal with his/her head down; and the mobile terminal CPU sends an instruction to the controller MCU module to make it sleep so as to reduce energy consumption when the angle of the inclination angle $\alpha$ is out of the range of angles at which the user normally uses the mobile terminal with his/her head down, which indicates that a mobile terminal user does not use the mobile terminal in a head-down state or stops using the mobile terminal;

S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;

S3, turning on, by the controller MCU module, a laser ranging circuit when determining that the mobile terminal user is in dynamic use, wherein a slope distance d is measured every time t, and a change amount $\Delta d$ of d within the time t is calculated by means of the controller MCU module, and when the absolute value of $\Delta d$ is less than a value D set in the controller MCU module, where D is a fluctuated slope distance error that may exist when a person uses a mobile terminal while walking, it indicates that there is no obstacle in front of the mobile phone user in his/her walking direction; and S4, when the absolute value of $\Delta d$ is greater than the value of D set in the controller, which indicates that there is an obstacle in front of the mobile terminal user in his/her walking direction, and when the value of $\Delta d$ is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of $\Delta d$ is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification, so as to determine a degree of the danger.

As a preferred technical solution, when a zebra crossing appears in front of the mobile terminal, since power transmitted by a laser is constant, but amounts of laser reflected off the zebra crossing are different, that is, the amount of laser reflected off white lines of the zebra crossing is greater than the amount of laser reflected off black color of an asphalt road, an amplified amplitude signal is processed by means of a laser receiving circuit in the receiving module; and when a group of pulse signals with relatively regular amplitude changes are received, it is determined that the user is walking across the zebra crossing, the controller MCU module sends a corresponding instruction to the mobile terminal CPU, invokes a voice data segment to repeatedly play "there is a zebra crossing ahead", and at the same time, turns on the front-end main camera and switches to the screen of the mobile terminal for the user to make further identification and verification.

As a preferred technical solution, when there is a puddle in front of the mobile terminal, the infrared receiving circuit is configured to perform identification based on a difference between a received amount of infrared radiation from a sidewalk and a received amount of infrared radiation from water in the puddle; when the mobile terminal user is in dynamic use and walks on the sidewalk, the infrared receiving circuit receives the amount of infrared radiation from the sidewalk, which is amplified to form a certain amount of output signal to be input to the controller; and when the mobile terminal user is in dynamic use and walks on the sidewalk with water or a puddle ahead, because the amount of infrared radiation from the water is small and the change amount thereof is very small, the amount of infrared radiation from the water or the puddle that is received by the infrared receiving circuit is about zero, and the controller MCU module detects that a signal input by the infrared receiving circuit goes to zero abruptly, and therefore determines that there is water or a puddle ahead; and the controller MCU module sends a corresponding instruction to the mobile terminal CPU and invokes a voice data segment to repeatedly play "there is water or a puddle ahead", and at the same time, turns on the front-end main camera and switches to the screen of the mobile terminal for the user to make further identification and verification.

Compared with the prior art, the present invention has the advantages and beneficial effects as follows.

1. In the present invention, the nature of an obstacle in front of a mobile terminal can be automatically identified, which comprises automatically identifying an infrared radiation object moving in front of the mobile terminal, a zebra crossing on the road surface, the height of a protruding obstacle relative to the road surface, the depth of a recessed obstacle relative to the road surface, a puddle, etc., thereby minimizing the risk of various dangerous situations such as hit by a car while walking across a zebra crossing, falling into a ditch while walking on a roadside, stepping on empty at a platform, stepping on empty while going upstairs and downstairs on a flyover, tripped by various road obstacles (road construction materials, curb sides) that may be caused due to a blind area generated in front of the mobile terminal when the mobile terminal user uses the mobile terminal.

2. The present invention has an automatic voice and video alarming function, which automatically plays different voice data segments and automatically switches to a front video for verification according to the natures of the obstacles in front of the mobile terminal, so as to determine a degree of the danger ahead.

3. The present invention can achieve identification of the mobile terminal user in static and dynamic use states by means of infrared detection, so as to reduce energy consumption of the entire machine.

4. The present invention also has a function of an electronic measuring ruler.

Figure 1:
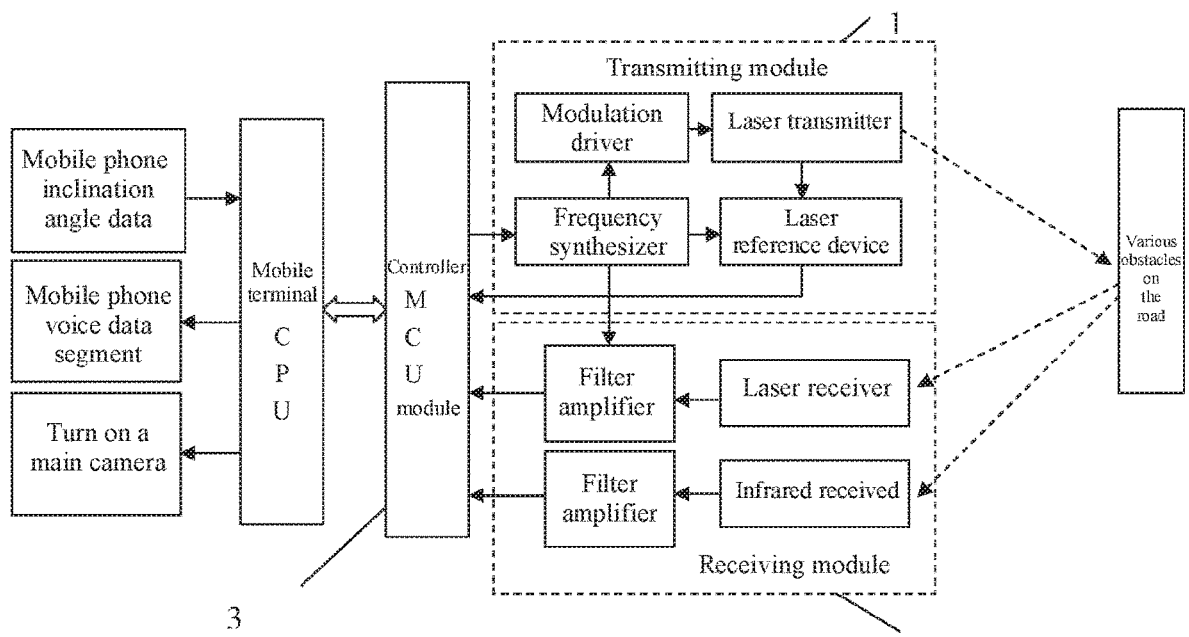
FIG. 1 is a structural block diagram of an apparatus according to the present invention.

Description of reference numerals: 1. transmitting module; 2. receiving module; 3. controller MCU module; and 4. main board of mobile terminal.

DETAILED DESCRIPTION

The present invention will be further described in detail below in connection with embodiments and the accompanying drawings, but the embodiments of the present invention are not limited thereto.

EMBODIMENTS

As shown in FIG. 1, this embodiment discloses an apparatus capable of automatically identifying an obstacle in front of a mobile terminal, the apparatus comprising a transmitting module 1, a receiving module 2, and a controller MCU module 3. The transmitting module is in signal connection to the receiving module, the transmitting module and the receiving module are both in signal connection to the controller MCU module, and the controller MCU module is also in signal connection to a mobile terminal CPU. The transmitting module is configured to generate a laser transmitting signal and a difference frequency ranging signal containing phase information. The receiving module is configured to receive a laser transmitting signal when ranging and receive an infrared pyroelectric signal of a human body or a road surface when not ranging. The controller MCU module is configured to identify a ranging signal and an infrared signal, and drive a corresponding voice data segment for playback and turn on a front-end main camera working by means of the mobile terminal CPU so as to use voice to prompt a mobile terminal user to pay attention and to display a dangerous situation in front of the user by means of the front-end camera of the mobile terminal.

Figure 2:
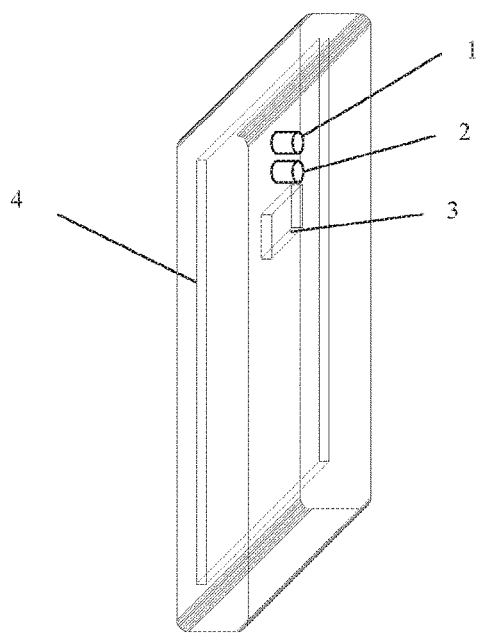
FIG. 2 is a schematic diagram of installing the apparatus according to the present invention on a mobile terminal.

As shown in FIG. 2, the transmitting module comprises a modulation driver, a laser transmitter, a laser reference device, and a frequency synthesizer; and the frequency synthesizer is in signal connection to the modulation driver and the laser reference device, and the modulation driver, the laser transmitter, and the laser reference device are sequentially connected. the transmitting module is mounted near the main camera on the mobile terminal, a circular hole with the same diameter as the transmitting module is provided on the rear cover of the mobile terminal, and a laser signal of the transmitting module is transmitted through that circular hole.

As shown in FIG. 2, the receiving module comprises a laser receiver, an infrared receiver, and filter amplifiers, and the laser receiver and the infrared receiver are both in signal connection to the corresponding filter amplifier. The receiving module is mounted in a position close to the lower part of the transmitting module, another circular hole with the same diameter as the receiving module is provided on the rear cover of the mobile terminal, and the receiving module receives a laser signal reflected from a laser and an infrared signal of a road surface or a human body through that circular hole.

The controller MCU module is an STM32F103RBT6 micro-controller, which is mounted in the middle part of a main board 4 of the mobile terminal and is in signal connection to the mobile terminal CPU module and the receiving module. When the mobile terminal is redesigned, the module function can be fully integrated with a mobile phone CPU to reduce space occupied by the module, reduce power consumption, and improve reliability of the entire machine.

On the basis of the above-mentioned apparatus, a method for identifying an obstacle of the present invention is specifically described. In this method, a mobile phone is taken as an example for description, however other smart mobile terminals such as PAD are also applicable to the present invention.

Figure 3:
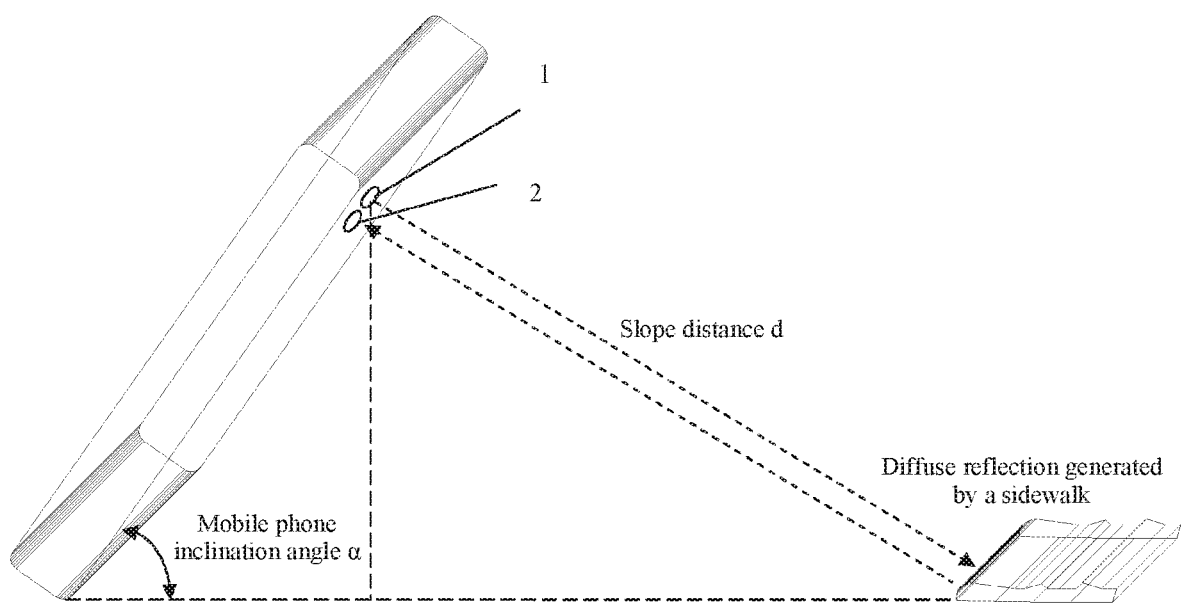
FIG. 3 is a schematic diagram of sidewalk ranging performed by an apparatus automatically identifying an obstacle in front of a mobile terminal according to the present invention.

A ranging process according to the present invention is as follows:

Ranging is performed by using a phase method. In a ranging process on a road surface of a sidewalk in front of a mobile phone, a frequency synthesis circuit in a transmitting module generates a master oscillator signal and a local oscillator signal under the control of the controller MCU module. The master oscillator signal drives a laser transmitting circuit to perform modulation transmission by means of a modulation driving circuit. After laser splitting, a part of the laser is split to a laser reference circuit so as to be frequency mixed with the local oscillator signal to obtain a difference frequency signal containing initial phase information, which is input to a controller MCU module. The other part of the laser is transmitted out, which is diffusely reflected off the road surface, then is frequency mixed with the local oscillator signal after the reflected laser signal is received, filtered and amplified by a laser receiving circuit in a receiving module, so as to obtain a difference frequency signal containing phase information about a ranging signal, which is input to the controller MCU module. After phase discrimination and phase difference calculation are performed in the controller MCU module, a slope distance d from a laser transmitting hole of the mobile phone to the road surface of the sidewalk can be measured. A schematic diagram of sidewalk ranging performed by an apparatus automatically identifying an obstacle in front of a mobile phone is shown in FIG. 3.

A method for measuring an infrared signal according to the present invention is as follows.

An infrared receiving circuit in the receiving module is configured to identify static and dynamic use states of the mobile phone user. The infrared receiving circuit performs infrared detection on an object in front of the mobile phone user, and can sense infrared spontaneously radiated by the object in the environment ahead. The infrared receiving circuit is mainly composed of a binary pyroelectric infrared sensor and a circuit for processing signals. When the mobile phone user uses the mobile phone in a stationary state (office, subway, etc.), there is no moving heat source object entering a detection area, the two infrared detectors generate the same signal due to the same background, and no signal is output; and when the mobile phone user uses the mobile phone in a movement state, after infrared radiation generated by a moving human body and a road surface ahead enters an infrared receiving area, the two infrared detectors of the binary pyroelectric infrared sensor receive different infrared radiation and generate different signals, and an output signal is generated. Because the infrared receiving circuit performs passive infrared detection with a low electricity consumption, the power consumption of the entire machine can be reduced.

Figure 4:
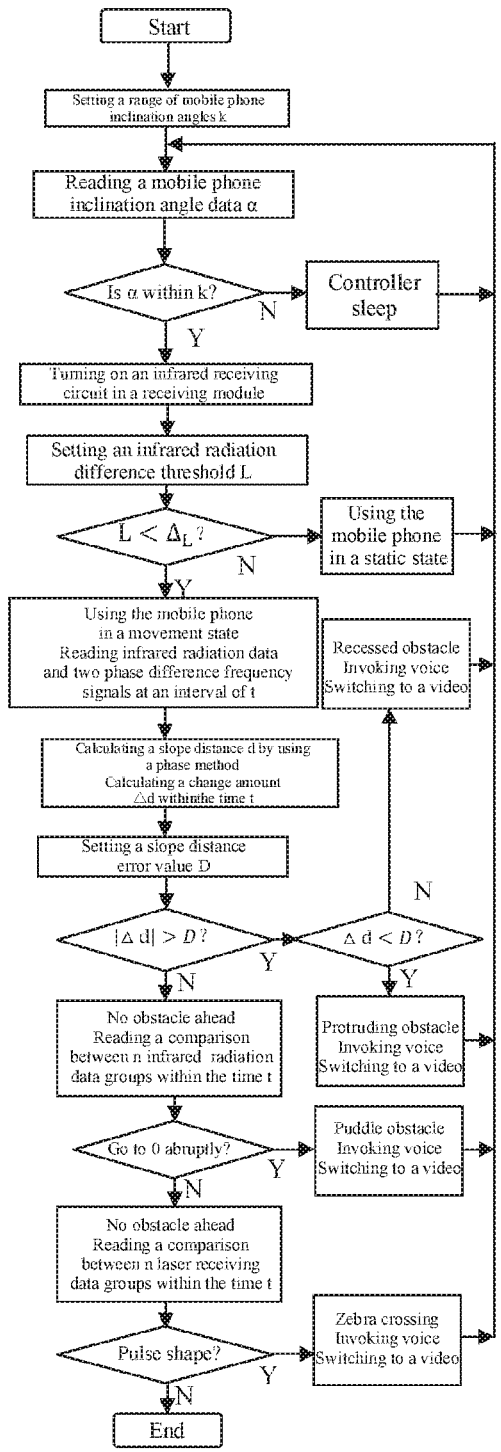
FIG. 4 is a flowchart of an obstacle identification method according to the present invention.

As shown in FIG. 4, a method of the apparatus automatically identifying the obstacle in front of the mobile terminal comprises the steps of:

1. Identifying that a mobile phone user uses a mobile phone with his/her head down When a mobile phone user uses a mobile phone, a mobile phone CPU calculates a mobile phone inclination angle α in real time by means of a mobile phone content acceleration sensor and gyroscope sensor, wherein the mobile phone CPU sends an instruction to a controller MCU module to wake it up for working when the angle of a is in a range of angles at which the user normally uses the mobile phone with his/her head down; and the mobile phone CPU sends an instruction to the controller MCU module to make it sleep so as to reduce energy consumption when the angle of the mobile phone user a is out of the range of angles at which the user normally uses the mobile phone with his/her head down, which indicates that the mobile phone user does not use the mobile phone in a head-down state or stops using the mobile phone.

2. Identifying static and dynamic use states of the mobile phone user

After the controller MCU module is turned on for working, the module controls turning on of an infrared receiving circuit in a receiving module for working. When the mobile phone user uses the mobile phone in a stationary state (office, subway, etc.), there is no moving heat source object entering a detection area, no signal is output to the controller, and therefore it is determined that the mobile phone is in static use; and when the mobile phone user uses the mobile phone in a movement state, after infrared radiation generated by a moving human body and a road surface ahead enters an infrared receiving area, an output signal is generated to the controller, and therefore it is determined that the mobile phone is in dynamic use.

3. Identifying an obstacle ahead when the mobile phone user is in dynamic use

When the controller determines that the mobile phone is in dynamic use, a laser ranging circuit is enabled, wherein a slope distance d is measured every time t, and a change amount $\Delta d$ of d within the time t is calculated by means of the controller. When the absolute value of $\Delta d$ is less than a value D (D is a fluctuated slope distance error that may exist when a person uses a mobile phone while walking) set in the controller, it indicates that there is no obstacle is in front of the mobile phone user in his/her walking direction.

When the absolute value of $\Delta d$ is greater than the value of D set in the controller, it indicates that there is an obstacle in front of the mobile phone user in his/her walking direction. When the value of $\Delta d$ is negative, it is identified that there is a protruding obstacle ahead, the controller sends a corresponding instruction to the mobile phone CPU, invokes a voice data segment to repeatedly play "there is a protruding obstacle with a height of XXX meters ahead", and at the same time, turns on a front-end main camera and switches to a screen of the mobile phone for the mobile phone user to make further identification and verification; and when the value of $\Delta d$ is positive, it is identified that there is a recessed obstacle ahead, the controller sends a corresponding instruction to the mobile phone CPU, invokes a voice data segment to repeatedly play "there is a recessed obstacle with a depth of XXX meters ahead", and at the same time, turns on the front-end main camera and switches to the screen of the mobile phone for the mobile phone user to make further identification and verification, so as to determine a degree of the danger.

Figure 5:
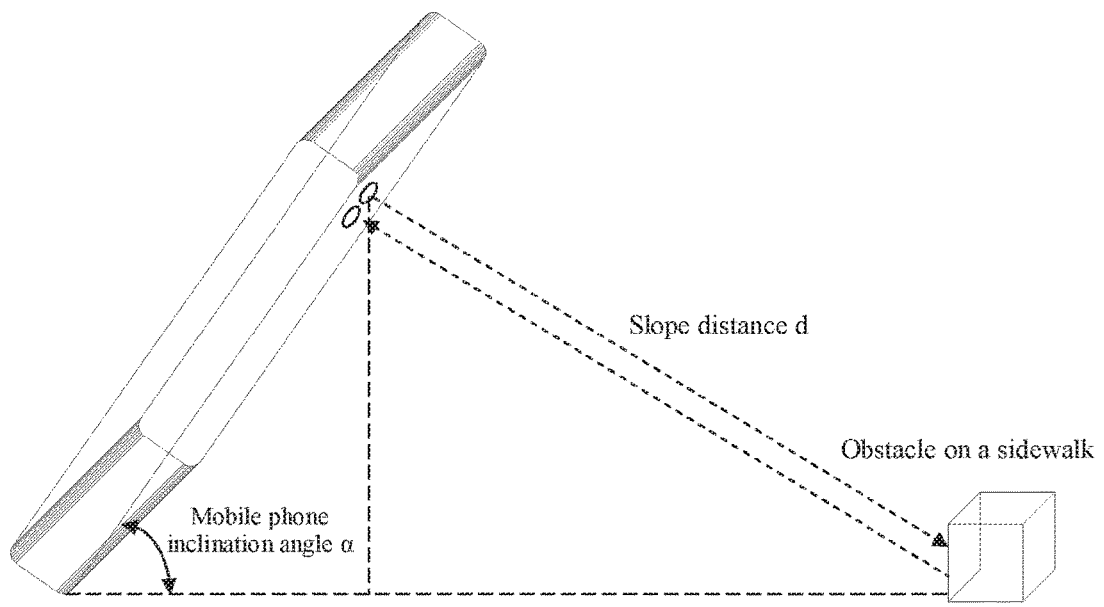
FIG. 5 is a schematic diagram of protruding obstacle ranging performed by an apparatus automatically identifying an obstacle in front of a mobile terminal according to the present invention.
Figure 6:
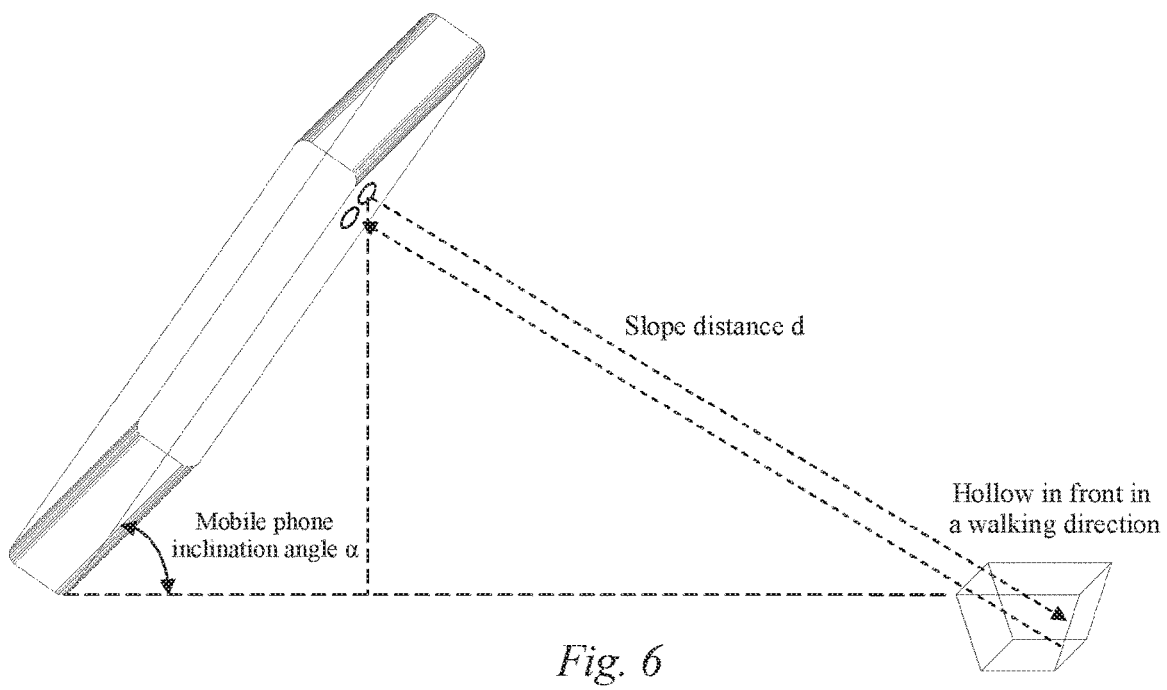
FIG. 6 is a schematic diagram of recessed obstacle ranging performed by an apparatus automatically identifying an obstacle in front of a mobile terminal according to the present invention.

Schematic diagrams of identification an obstacle ahead when the mobile phone user is in dynamic use are shown in FIG. 5 and FIG. 6.

Figure 7:
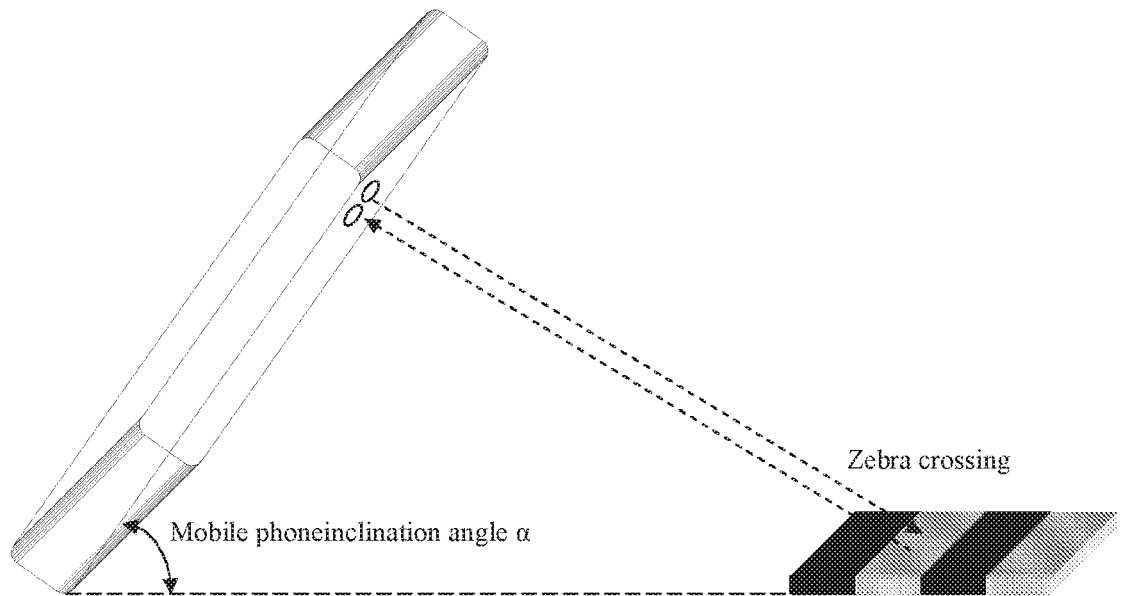
FIG. 7 is a schematic diagram of zebra crossing identification performed by an apparatus automatically identifying an obstacle in front of a mobile terminal according to the present invention.

4. Identifying a zebra crossing ahead when the mobile phone user is in dynamic use It is very dangerous for a mobile phone user to use a mobile phone on a zebra crossing with his/her head down. When a zebra crossing appears in front of the mobile phone, since power transmitted by a laser is constant, but the amount of laser reflected off the zebra crossing are different, that is, the amount of laser reflected off white lines on the zebra crossing is greater than the amount of laser reflected off black color of an asphalt road, an amplified amplitude signal is processed by means of a laser receiving circuit in the receiving module; and when a group of pulse signals with relatively regular amplitude changes are received, it is determined that the user is walking across the zebra crossing, the controller sends a corresponding instruction to the mobile phone CPU, invokes a voice data segment to repeatedly play "there is a zebra crossing ahead", and at the same time, turns on the front-end main camera and switches to the screen of the mobile phone for the mobile phone user to make further identification and verification. A schematic diagram of zebra crossing identification performed by the apparatus automatically identifying the obstacle in front of the mobile phone is shown in FIG. 7.

Figure 8:
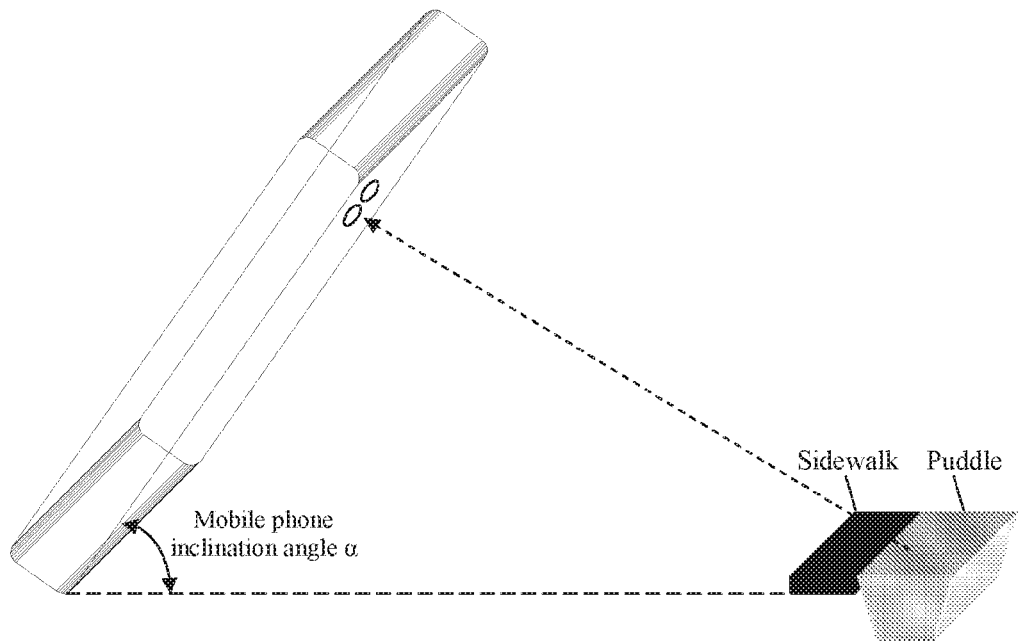
FIG. 8 is a schematic diagram of water or puddle identification performed by an apparatus automatically identifying an obstacle in front of a mobile terminal according to the present invention.

5. Identifying that there may be a puddle ahead when the mobile phone user is in dynamic use When the mobile phone user is in dynamic use, if there is a puddle ahead, a laser ranging method cannot be used for identification. The infrared receiving circuit is configured to perform identification based on a difference between a received amount of infrared radiation from a sidewalk and a received amount of infrared radiation from water in the puddle. When the mobile phone user is in dynamic use and walks on the sidewalk, the infrared receiving circuit receives the amount of infrared radiation from the sidewalk, which is amplified to form a certain amount of output signal to be input to the controller; and when the mobile phone user is in dynamic use and walks on the sidewalk with water or a puddle ahead, because the amount of infrared radiation from the water is small and the change amount thereof is very small, the amount of infrared radiation from the water or the puddle that is received by the infrared receiving circuit is about zero, and the controller detects that a signal input by the infrared receiving circuit goes to zero abruptly, and therefore determines that there is water or a puddle ahead; and the controller sends a corresponding instruction to the mobile phone CPU and invokes a voice data segment to repeatedly play "there is water or a puddle ahead", and at the same time, turns on the front-end main camera and switches to the screen of the mobile phone for the mobile phone user to make further identification and verification. A schematic diagram of water or puddle identification performed by the apparatus automatically identifying the obstacle in front of the mobile phone is shown in FIG. 8.

By means of the present invention, the nature of an obstacle in front of a mobile terminal is automatically identified, which comprises automatically identifying an infrared radiation object moving in front of the mobile phone, a zebra crossing on the road surface, the height of a protruding obstacle relative to the road surface, the depth of a recessed obstacle relative to the road surface, a puddle, etc., thereby minimizing the risk of various dangerous situations such as hit by a car while walking across a zebra crossing, falling into a ditch while walking on a roadside, stepping on empty at a platform, stepping on empty while going upstairs and downstairs on a flyover, tripped by various road obstacles (road construction materials, curb sides) that may be caused due to a blind area generated in front of the mobile phone when a mobile phone head-down user uses the mobile phone.

The above-described embodiments are preferred embodiments of the present invention; however, the embodiments of the present invention are not limited to the above-described embodiments, and any other change, modification, replacement, combination, and simplification made without departing from the spirit, essence, and principle of the present invention should be an equivalent replacement and should be included within the scope of protection of the present invention.

The invention claimed is:

1. An apparatus capable of automatically identifying an obstacle in front of a mobile terminal, comprising
    a transmitting module,
    a receiving module, and
    a controller MCU module,
    wherein the transmitting module is in signal connection to the receiving module, the transmitting module and the receiving module are both in signal connection to the controller MCU module, and the controller MCU module is also in signal connection to a mobile terminal CPU; and
    wherein the transmitting module is configured to generate a laser transmitting signal and a difference frequency ranging signal containing phase information; the receiving module is configured to receive a laser transmitting signal when ranging and receive an infrared pyroelectric signal of a human body or a road surface when not ranging; and the controller MCU module is configured to identify a ranging signal and an infrared signal, and drive a corresponding voice data segment for playback and turn on a front-end main camera for working by means of the mobile terminal CPU so as to use voice to prompt a mobile terminal user to pay attention and to display a dangerous situation in front of the user by means of the front-end camera of the mobile terminal.

2. The apparatus capable of automatically identifying an obstacle in front of a mobile terminal of claim 1, wherein the transmitting module comprises a modulation driver, a laser transmitter, a laser reference device, and a frequency synthesizer; and the frequency synthesizer is in signal connection to the modulation driver and the laser reference device, and the modulation driver, the laser transmitter, and the laser reference device are sequentially connected.

3. The apparatus capable of automatically identifying an obstacle in front of a mobile terminal of claim 1, wherein the transmitting module is mounted near the main camera on the mobile terminal, a circular hole with the same diameter as the transmitting module is provided on the rear cover of the mobile terminal, and a laser signal of the transmitting module is transmitted through that circular hole.

4. The apparatus capable of automatically identifying an obstacle in front of a mobile terminal of claim 1, wherein the receiving module comprises a laser receiver, an infrared receiver, and filter amplifiers, and the laser receiver and the infrared receiver are both in signal connection to the corresponding filter amplifier.

5. The apparatus capable of automatically identifying an obstacle in front of a mobile terminal of claim 1, wherein the receiving module is mounted in a position close to the lower part of the transmitting module, another circular hole with the same diameter as the receiving module is provided on the rear cover of the mobile terminal, and the receiving module receives a laser signal reflected from a laser and an infrared pyroelectric signal of a road surface or a human body through that circular hole.

6. The apparatus capable of automatically identifying an obstacle in front of a mobile terminal of claim 1, wherein the controller MCU module is an STM32F103RBT6 microcontroller, which is mounted in the middle part of a main board of the mobile terminal and is in signal connection to the mobile terminal CPU module, the transmitting module and the receiving module.

7. A method of using the apparatus of claim 1 for automatically identifying an obstacle in front of a mobile terminal, comprising the steps of:
    S1, calculating, by the mobile terminal CPU, a mobile terminal inclination angle $\alpha$ in real time by means of a built-in acceleration sensor and gyroscope sensor when the mobile terminal is in use, wherein the mobile terminal CPU sends an instruction to the controller MCU module to wake it up for working when the angle of $\alpha$ is in a range of angles at which the user normally uses the mobile terminal with his/her head down; and the mobile terminal CPU sends an instruction to the controller MCU module to make it sleep so as to reduce energy consumption when the angle of the inclination angle $\alpha$ is out of the range of angles at which the user normally uses the mobile terminal with his/her head down, which indicates that a mobile terminal user does not use the mobile terminal in a head-down state or stops using the mobile terminal;
    S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;
    S3, turning on, by the controller MCU module, a laser ranging circuit when determining that the mobile terminal user is in dynamic use, wherein a slope distance d is measured every time t, and a change amount $\Delta d$ of d within the time t is calculated by means of the controller MCU module, and when the absolute value of $\Delta d$ is less than a value D set in the controller MCU module, where D is a fluctuated slope distance error that may exist when a person uses a mobile terminal while walking, it indicates that there is no obstacle in front of the mobile phone user in his/her walking direction; and
    S4, when the absolute value of $\Delta d$ is greater than the value of D set in the controller, which indicates that there is an obstacle in front of the mobile terminal user in his/her walking direction, and when the value of $\Delta d$ is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of Δd is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification so as to determine a degree of the danger.

8. The method of the apparatus automatically identifying an obstacle in front of a mobile terminal of claim 7, wherein when a zebra crossing appears in front of the mobile terminal, since power transmitted by a laser is constant, but amounts of laser reflected off the zebra crossing are different, that is, the amount of laser reflected off white lines of the zebra crossing is greater than the amount of laser reflected off black color of an asphalt road, an amplified amplitude signal is processed by means of a laser receiving circuit in the receiving module; and when a group of pulse signals with relatively regular amplitude changes are received, it is determined that the user is walking across the zebra crossing, the controller MCU module sends a corresponding instruction to the mobile terminal CPU, invokes a voice data segment to repeatedly play "there is a zebra crossing ahead", and at the same time, turns on the front-end main camera and switches to the screen of the mobile terminal for the user to make further identification and verification.

9. The method of the apparatus automatically identifying an obstacle in front of a mobile terminal of claim 7, wherein
when there is a puddle in front of the mobile terminal, the infrared receiving circuit is configured to perform identification based on a difference between a received amount of infrared radiation from a sidewalk and a received amount of infrared radiation from water in the puddle;
when the mobile terminal user is in dynamic use and walks on the sidewalk, the infrared receiving circuit receives the amount of infrared radiation from the sidewalk, which is amplified to form a certain amount of output signal to be input to the controller; and
when the mobile terminal user is in dynamic use and walks on the sidewalk with water or a puddle ahead, because the amount of infrared radiation from the water is small and the change amount thereof is very small, the amount of infrared radiation from the water or the puddle that is received by the infrared receiving circuit is about zero, and the controller MCU module detects that a signal input by the infrared receiving circuit goes to zero abruptly, and therefore determines that there is water or a puddle ahead; and
the controller MCU module sends a corresponding instruction to the mobile terminal CPU and invokes a voice data segment to repeatedly play "there is water or a puddle ahead", and at the same time, turns on the front-end main camera and switches to the screen of the mobile terminal for the user to make further identification and verification.

10. The apparatus capable of automatically identifying an obstacle in front of a mobile terminal of claim 2, wherein the transmitting module is mounted near the main camera on the mobile terminal, a circular hole with the same diameter as the transmitting module is provided on the rear cover of the mobile terminal, and a laser signal of the transmitting module is transmitted through that circular hole.

11. The apparatus capable of automatically identifying an obstacle in front of a mobile terminal of claim 4, wherein the receiving module is mounted in a position close to the lower part of the transmitting module, another circular hole with the same diameter as the receiving module is provided on the rear cover of the mobile terminal, and the receiving module receives a laser signal reflected from a laser and an infrared pyroelectric signal of a road surface or a human body through that circular hole.

12. A method of using the apparatus of claim 2 for automatically identifying an obstacle in front of a mobile terminal, comprising the steps of:
S1, calculating, by the mobile terminal CPU, a mobile terminal inclination angle α in real time by means of a built-in acceleration sensor and gyroscope sensor when the mobile terminal is in use, wherein the mobile terminal CPU sends an instruction to the controller MCU module to wake it up for working when the angle of α is in a range of angles at which the user normally uses the mobile terminal with his/her head down; and the mobile terminal CPU sends an instruction to the controller MCU module to make it sleep so as to reduce energy consumption when the angle of the inclination angle α is out of the range of angles at which the user normally uses the mobile terminal with his/her head down, which indicates that a mobile terminal user does not use the mobile terminal in a head-down state or stops using the mobile terminal;
S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;
S3, turning on, by the controller MCU module, a laser ranging circuit when determining that the mobile terminal user is in dynamic use, wherein a slope distance d is measured every time t, and a change amount Δd of d within the time t is calculated by means of the controller MCU module, and when the absolute value of Δd is less than a value D set in the controller MCU module, where D is a fluctuated slope distance error that may exist when a person uses a mobile terminal while walking, it indicates that there is no obstacle in front of the mobile phone user in his/her walking direction; and
S4, when the absolute value of Δd is greater than the value of D set in the controller, which indicates that there is an obstacle in front of the mobile terminal user in his/her walking direction, and when the value of Δd is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of Δd is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification so as to determine a degree of the danger.

13. A method of using the apparatus of claim 3 for automatically identifying an obstacle in front of a mobile terminal 3, comprising the steps of:

S1, calculating, by the mobile terminal CPU, a mobile terminal inclination angle α in real time by means of a built-in acceleration sensor and gyroscope sensor when the mobile terminal is in use, wherein the mobile terminal CPU sends an instruction to the controller MCU module to wake it up for working when the angle of α is in a range of angles at which the user normally uses the mobile terminal with his/her head down; and the mobile terminal CPU sends an instruction to the controller MCU module to make it sleep so as to reduce energy consumption when the angle of the inclination angle α is out of the range of angles at which the user normally uses the mobile terminal with his/her head down, which indicates that a mobile terminal user does not use the mobile terminal in a head-down state or stops using the mobile terminal;

S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;

S3, turning on, by the controller MCU module, a laser ranging circuit when determining that the mobile terminal user is in dynamic use, wherein a slope distance d is measured every time t, and a change amount Δd of d within the time t is calculated by means of the controller MCU module, and when the absolute value of Δd is less than a value D set in the controller MCU module, where D is a fluctuated slope distance error that may exist when a person uses a mobile terminal while walking, it indicates that there is no obstacle in front of the mobile phone user in his/her walking direction; and S4, when the absolute value of Δd is greater than the value of D set in the controller, which indicates that there is an obstacle in front of the mobile terminal user in his/her walking direction, and when the value of Δd is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of Δd is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification so as to determine a degree of the danger.

14. A method of using the apparatus of claim 4 for automatically identifying an obstacle in front of a mobile terminal, comprising the steps of:

S1, calculating, by the mobile terminal CPU, a mobile terminal inclination angle α in real time by means of a built-in acceleration sensor and gyroscope sensor when the mobile terminal is in use, wherein the mobile terminal CPU sends an instruction to the controller MCU module to wake it up for working when the angle of α is in a range of angles at which the user normally uses the mobile terminal with his/her head down; and the mobile terminal CPU sends an instruction to the controller MCU module to make it sleep so as to reduce energy consumption when the angle of the inclination angle α is out of the range of angles at which the user normally uses the mobile terminal with his/her head down, which indicates that a mobile terminal user does not use the mobile terminal in a head-down state or stops using the mobile terminal;

S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;

S3, turning on, by the controller MCU module, a laser ranging circuit when determining that the mobile terminal user is in dynamic use, wherein a slope distance d is measured every time t, and a change amount Δd of d within the time t is calculated by means of the controller MCU module, and when the absolute value of Δd is less than a value D set in the controller MCU module, where D is a fluctuated slope distance error that may exist when a person uses a mobile terminal while walking, it indicates that there is no obstacle in front of the mobile phone user in his/her walking direction; and S4, when the absolute value of Δd is greater than the value of D set in the controller, which indicates that there is an obstacle in front of the mobile terminal user in his/her walking direction, and when the value of Δd is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of Δd is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification so as to determine a degree of the danger.

15. A method of using the apparatus of claim 5 for automatically identifying an obstacle in front of a mobile terminal, comprising the steps of:
   S1, calculating, by the mobile terminal CPU, a mobile terminal inclination angle α in real time by means of a built-in acceleration sensor and gyroscope sensor when the mobile terminal is in use, wherein the mobile terminal CPU sends an instruction to the controller MCU module to wake it up for working when the angle of α is in a range of angles at which the user normally uses the mobile terminal with his/her head down; and the mobile terminal CPU sends an instruction to the controller MCU module to make it sleep so as to reduce energy consumption when the angle of the inclination angle α is out of the range of angles at which the user normally uses the mobile terminal with his/her head down, which indicates that a mobile terminal user does not use the mobile terminal in a head-down state or stops using the mobile terminal;
   S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;
   S3, turning on, by the controller MCU module, a laser ranging circuit when determining that the mobile terminal user is in dynamic use, wherein a slope distance d is measured every time t, and a change amount Δd of d within the time t is calculated by means of the controller MCU module, and when the absolute value of Δd is less than a value D set in the controller MCU module, where D is a fluctuated slope distance error that may exist when a person uses a mobile terminal while walking, it indicates that there is no obstacle in front of the mobile phone user in his/her walking direction; and
   S4, when the absolute value of Δd is greater than the value of D set in the controller, which indicates that there is an obstacle in front of the mobile terminal user in his/her walking direction, and when the value of Δd is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of Δd is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification so as to determine a degree of the danger.

16. A method of using the apparatus of claim 6 for automatically identifying an obstacle in front of a mobile terminal, comprising the steps of:
   S1, calculating, by the mobile terminal CPU, a mobile terminal inclination angle α in real time by means of a built-in acceleration sensor and gyroscope sensor when the mobile terminal is in use, wherein the mobile terminal CPU sends an instruction to the controller MCU module to wake it up for working when the angle of α is in a range of angles at which the user normally uses the mobile terminal with his/her head down; and the mobile terminal CPU sends an instruction to the controller MCU module to make it sleep so as to reduce energy consumption when the angle of the inclination angle α is out of the range of angles at which the user normally uses the mobile terminal with his/her head down, which indicates that a mobile terminal user does not use the mobile terminal in a head-down state or stops using the mobile terminal;
   S2, controlling, by the controller MCU module, turning on of an infrared receiving circuit in the receiving module for working after the controller MCU module is turned on for working, wherein when the mobile terminal user uses the mobile terminal in a stationary state, there is no moving heat source object entering a detection area, an infrared receiver receives no dynamic infrared pyroelectric signal, and in this case, a signal output to the controller MCU module is zero, and therefore it is determined that the mobile terminal is in static use; and when the mobile terminal user uses the mobile terminal in a movement state, after infrared radiation generated by a moving human body and a road surface ahead enters an infrared receiving area, an output signal is generated to the controller MCU module, and therefore it is determined that the mobile terminal user is in dynamic use;
   S3, turning on, by the controller MCU module, a laser ranging circuit when determining that the mobile terminal user is in dynamic use, wherein a slope distance d is measured every time t, and a change amount Δd of d within the time t is calculated by means of the controller MCU module, and when the absolute value of $\Delta d$ is less than a value D set in the controller MCU module, where D is a fluctuated slope distance error that may exist when a person uses a mobile terminal while walking, it indicates that there is no obstacle in front of the mobile phone user in his/her walking direction; and S4, when the absolute value of $\Delta d$ is greater than the value of D set in the controller, which indicates that there is an obstacle in front of the mobile terminal user in his/her walking direction, and when the value of $\Delta d$ is negative, identifying that there is a protruding obstacle in front of the user, sending, by the controller MCU module, a corresponding instruction to the mobile terminal CPU, invoking a voice data segment to repeatedly play "there is a protruding obstacle with a height of XXX meters ahead", and at the same time, turning on the front-end main camera and switching to a screen of the mobile terminal for the user to make further identification and verification; and when the value of $\Delta d$ is positive, identifying that there is a recessed obstacle ahead, sending, by the controller MCU module, a corresponding instruction to the mobile terminal CPU, invoking a voice data segment to repeatedly play "there is a recessed obstacle with a depth of XXX meters ahead", and at the same time, turning on the front-end main camera and switching to the screen of the mobile terminal for the user to make further identification and verification so as to determine a degree of the danger.

* * * * *